United States Patent [19]

Applegate et al.

[11] 4,280,913
[45] Jul. 28, 1981

[54] WATER PURIFICATION PROCESS

[75] Inventors: Charles S. Applegate, Brookfield; Paul R. Erickson, Glendale, both of Wis.

[73] Assignee: Envirex, Inc., Waukesha, Wis.

[21] Appl. No.: 114,764

[22] Filed: Jan. 23, 1980

[51] Int. Cl.³ .............................................. B01D 37/02
[52] U.S. Cl. ..................................... 210/669; 210/778
[58] Field of Search ....................... 210/27, 40, 75, 77, 210/82, 403, 411, 663–669, 691, 694, 778, 791, 798

[56] References Cited

U.S. PATENT DOCUMENTS

| | | | |
|---|---|---|---|
| 2,179,028 | 11/1939 | Alton | 210/75 |
| 3,733,266 | 5/1973 | Bishop et al. | 210/40 |
| 3,904,518 | 9/1975 | Hutton et al. | 210/40 |
| 4,038,187 | 7/1977 | Saffran | 210/403 |
| 4,198,299 | 4/1980 | Ewing et al. | 210/403 |

Primary Examiner—Ivars C. Cintins
Attorney, Agent, or Firm—Aaron L. Hardt; Vance A. Smith

[57] ABSTRACT

A process for removing colloidal and soluble contaminants from impure water moving through a hollow, cylindrical microscreen under a positive head pressure, comprising dispersing insoluble, finely divided particulate matter into the impure water and rotating the microscreen at a rate that will form, during each rotation thereof, an intermixed layer of contaminants and particulate matter over substantially the entire inner surface of the microscreen through which the impure water is passing. The intermixed layer forms a filter substantially impermeable to contaminants and particulate matter of a size that could pass through the microscreen pores, but it is not impermeable to water. Preferably, the finely divided particulate matter can be a sorbent material, e.g. powdered activated carbon, so that contaminants are both filtered and sorbed from the water.

26 Claims, 5 Drawing Figures

WATER PURIFICATION PROCESS

BACKGROUND OF THE INVENTION

The present invention relates to water purification and, more particularly, to water purification employing a microscreen for filtration.

Hollow, cylindrical microscreens for water filtration are well known in the field of water purification. One such microscreen is disclosed in U.S. Pat. No. 4,038,187 granted to E. Saffran and entitled "Microscreen Drum," the teachings of which are incorporated herein by this reference thereto. However, it will be readily apparent that this invention can also be practiced with microscreens other than that taught by Saffran.

To be commercially useful, a microscreen must be able to pass large quantities of water each day. The rate of flow of water through a microscreen is directly proportional to the pressure head of the water and the microscreen pore size. Thus, if the pressure head is small, the amount of water passing through the microscreen might be inadequate for commercial usage. Conversely, if the pressure head is large, the microscreen might be unable to withstand the pressure and loose its integrity by tearing or rupturing, for example.

Likewise, if the pores of the microscreen are small, the rate of flow through the microscreen might be inadequate for commercial usage. Conversely, if the pores of the microscreen are large enough to insure a commercially useful flow rate, certain colloidal or soluble impurities present in impure water will not be filtered therefrom by the microscreen. Unfortunately, many impurities affecting the purity of water with regard to its biochemical oxygen demand, chemical oxygen demand, color, pH, odor, taste, total organic content, etc., are of a size that will not be filtered.

It is known in the prior art, as disclosed in U.S. Pat. No. 3,904,518 granted to D. Hutton, et al. and entitled "Waste Water Treatment Process" and U.S. Pat. No. 4,069,148 granted to D. Hutton, et al. and entitled "Industrial Waste Water Treatment Process" and an article in *Chemical Engineering* on Feb. 1, 1972 at page 36 entitled "New Water—Cleanup Roles for Powdered Activated Carbon" that activated carbon and other finely divided particulate matter can be used to help remove impurities of the size not filtered by commercially usable microscreens in water purification systems. Unfortunately, these finely divided particulate matters also comprise particles of a size that will not be filtered out of impure water to which they have been added, when that impure water moves through a microscreen having a pore size that will insure a commercially useful flow rate for a water purification process. The prior art systems, thus, must employ clarifier tanks that allow the particulate matter to settle out of the water before it passes from the system.

SUMMARY OF THE INVENTION

The primary object of the present invention, therefore, is to provide a water purification process that will be free from the aforementioned and other disadvantages of prior processes of this type. Accordingly, there is provided by the present invention a process of water purification wherein colloidal and soluble impurities, or contaminants, are removed from impure water moving through a hollow, cylindrical microscreen under a positive head pressure by dispersing finely divided particulate matter into the impure water and rotating the microscreen at a rate that will form, during each rotation thereof, an intermixed layer of contaminants and particulate matter over substantially the entire inner surface of the microscreen through which the impure water is passing. The intermixed layer forms a filter substantially impermeable to contaminants and particulate matter of a size that could pass through the microscreen, but it is not impermeable to water.

Preferably, the finely divided particulate matter can be a sorbent material, so that contaminants are both filtered and sorbed from the impure water. In the preferred embodiment of this invention, the microscreen can retain its integrity when exposed to positive head water pressures between 6 to 24 inches, the impure water has a head pressure between 6 to 24 inches, the microscreen has pore sizes between 1 to 30 microns in diameter, the finely divided particulate matter is powdered activated carbon having a diameter between 1 to 100 microns and the microscreen is rotated at a rate such that its periphery travels between 10 to 125 feet per minute.

BRIEF DESCRIPTION OF THE DRAWING

Other objects and attendant advantages will become obvious to those skilled in the art by reading the following detailed description in connection with the accompanying drawing, wherein like reference characters designate like or corresponding parts throughout the several figures thereof and wherein.

DETAILED DESCRIPTION OF THE INVENTION

Figure 1:
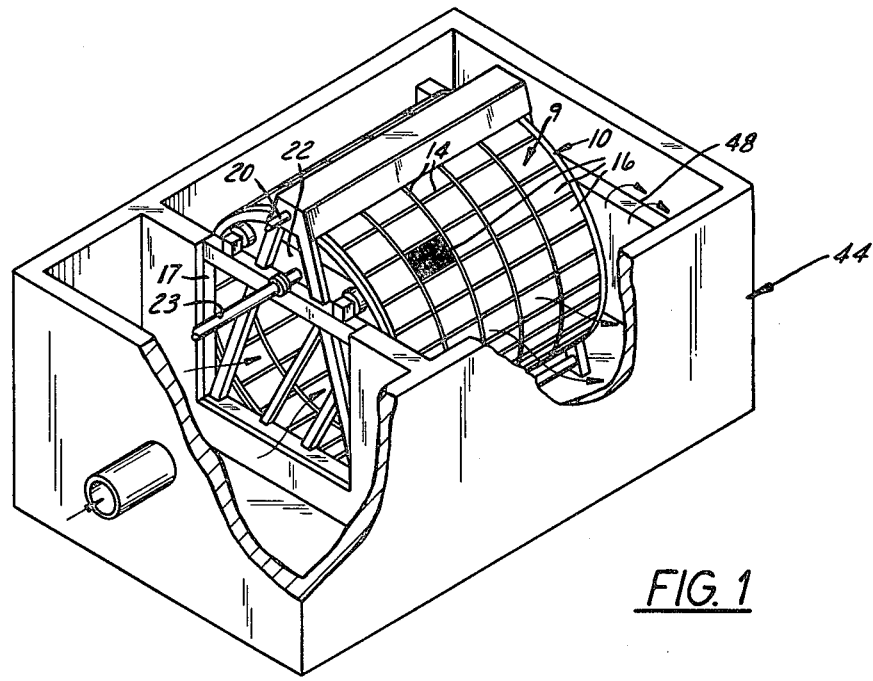
FIG. 1 is a perspective view of one rotary microscreen filter installation useful in the present invention.

Referring to the drawing, there is shown in FIG. 1, a preferred embodiment 9 of a hollow, cylindrical microscreen suitable for use in the process of this invention. While microscreen 9 has a circular cross-section, it will be apparent that it can also have other cross-sections, e.g. hexagonal or octagonal. Microscreen 9 is mounted on a hollow, cylindrical drum or frame 10 open at one end, closed at its opposite end and having a horizontal central axis 12 and axial and radial ribs 14. A plurality of microscreen grids 16 are mounted to ribs 14 of frame 10. Thus, a stream of impure water entering the cylindrical space within microscreen 9 through the open end of frame 10, under a positive head pressure can only exit therefrom by passing through microscreen grids 16, while at least some of the contaminants will not be able to pass through the microscreen grids 16 and will settle on the inner surface thereof.

Figure 2:
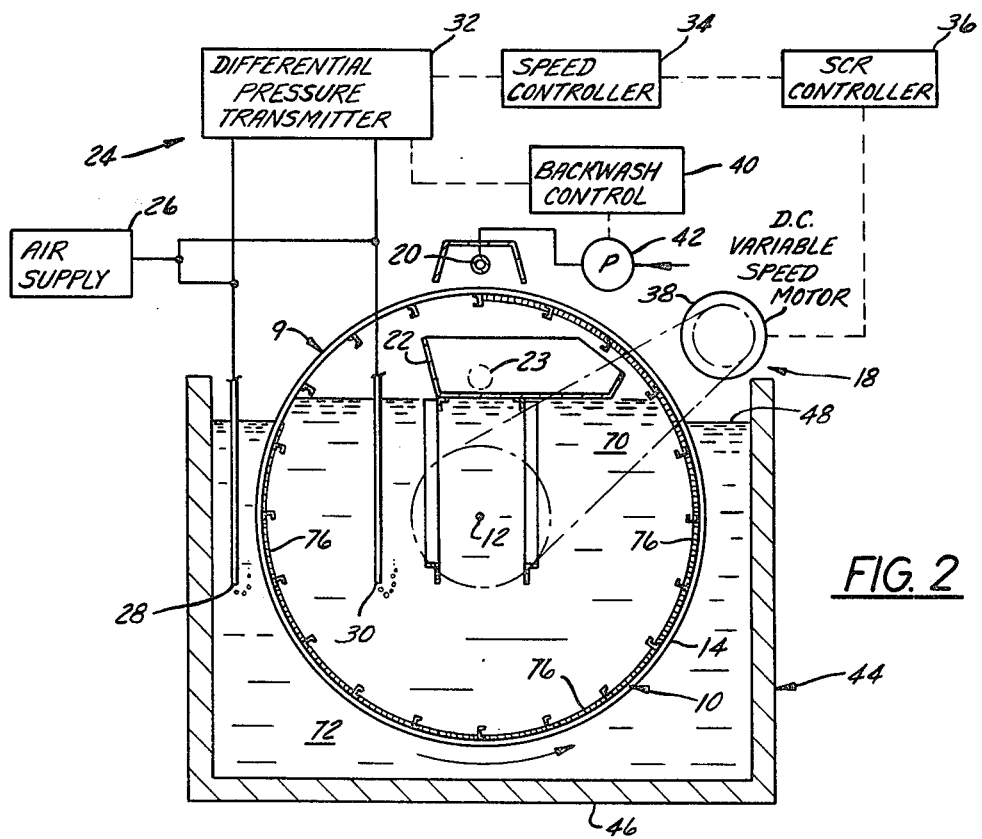
FIG. 2 is a cross-sectional view of the microscreen shown in FIG. 1, plus an exemplary control means for the backwash and rotational system thereof shown in block diagram form.

As shown in FIGS. 1 and 2, microscreen 9 also has means 17 for introducing the impure water to be moved through microscreen 9, means 18 for rotating frame 10 about central axis 12, a backwash header 20 mounted above the radially outer surface of frame 10, a backwash receiving trough 22 mounted within frame 10 for collecting matter washed off microscreen grid 16 by backwash head 20, and means 24 for controlling the speed at which means 18 rotates frame 10 and/or for controlling the output of backwash header 20 in response to the accumulation of matter on microscreen grids 16.

Means 24 can, for instance, comprise an air supply 26 to two orifices 28 and 30, one of which is located within frame 10 and the other of which is located outside frame 10, a differential pressure transmitter 32, a speed controller 34, an SCR controller 36, a variable speed motor 38, a backwash control 40, and a pump 42. With the rotary microscreen mounted in a, preferably, concrete or steel tank 44 for use, orifices 28 and 30 are located at the same distance above the bottom 46 of tank 44. The height of the liquid above bottom 46 of tank 44 outside frame 10 is kept constant by a weir 48 at the effluent end of tank 44, the top of which is, preferably, above the axis 12, as shown in FIG. 2.

The height of the liquid above bottom 46 of tank 44 inside frame 10 is a function of both weir 48 and the amount of matter accumulated on microscreen grids 16. When differential pressure transmitter 32 detects a predetermined pressure differential, indicating a predetermined height differential between the liquid inside and outside frame 10, speed controller 34 operates to increase the speed at which variable speed motor 38 causes frame 10 to rotate, thereby exposing each microscreen grid 16 to backwash header 20 more frequently, and backwash control 40 operates to turn the backwash header 20 on or to increase its output. Speed controller 34 and backwash control 40 can be designed to be responsive to the same pressure differential or to different pressure differentials, and an alarm and/or a system shutoff can be provided responsive to a pressure differential in excess of that necessary to activate speed controller 34 and backwash control 40. Also, speed controller 34 and backwash control 40 can be designed to continue their operation, once activated, either for a set length of time or until a predetermined lower pressure differential has been obtained.

Each of the microscreen grids 16 comprises a screening material that is commercially available, such as nylon, polyester, polytetrafluroethylene or stainless steel fabric. In the preferred microscreen of U.S. Pat. No. 4,038,187 and FIG. 1, the screening material is integrally molded into a honeycomb-type grid made of 20% glass-filled polypropylene. The grid is sealed at all its edges with a closed-cell, foam sealing material and clamped to ribs 14 of frame 10. The preferred microscreen 9 can maintain its integrity when impure water under a positive head pressure up to 24 inches is moved through it. If desired, microscreen 9 could be designed to withstand even greater head pressures.

Figure 3:
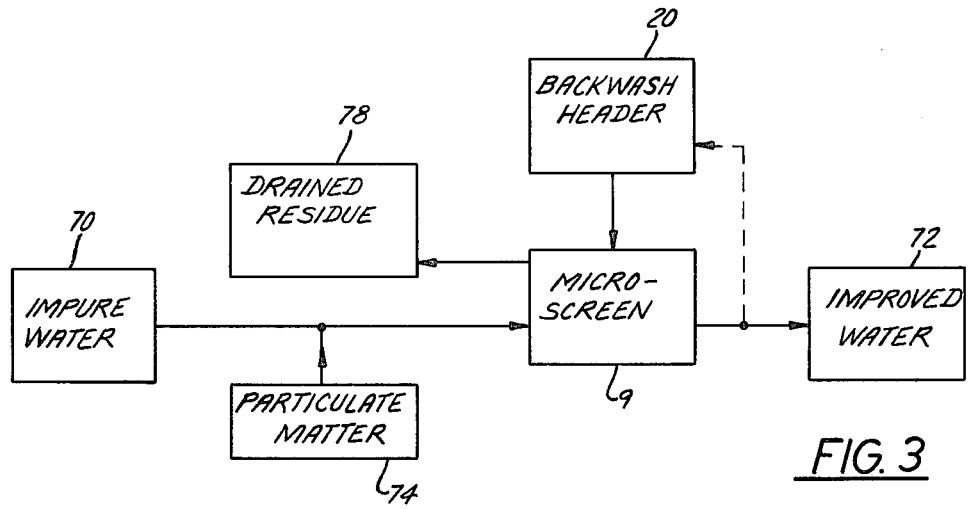
FIG. 3 is a schematic representation of the steps comprising a first embodiment of this invention.

FIG. 3 schematically illustrates the basic embodiment of the water purification process contemplated by this invention. Impure water 70 is moved through microscreen 9 under a positive head water pressure and emerges therefrom as improved water 72 ready for further use. Impure water 70, as contemplated in the process of FIG. 3, will be relatively clean water having mostly colloidal and soluble impurities or contaminants. Ideal applications for the process illustrated in FIG. 3 include the polishing of final municipal or industrial waste effluents, storm water overflow treatments and treatment of potable water for the removal of trace impurities, especially dissolved or refractory organic materials and chlorine.

To be commercially useful, the rate of flow of impure water 70 through microscreen 9, preferably, should be between about 6 to 10 gallons per minute per square foot of the microscreen's submersed periphery. As stated above, the rate of flow of impure water 70 through microscreen 9 is directly proportional to the positive head pressure of impure water 70 as it passes through microscreen 9 and the pore size of the screening material of microscreen grids 16. Thus, for a preferred flow rate, if the head pressure of impure water 70 as it passes through microscreen 9 is between substantially 6 and 24 inches, then the screening material of microscreen grids 16 can have pore sizes ranging from substantially 1 to 30 microns. Preferably, the screening material can have pores substantially all six microns in diameter.

With the head pressure of impure water 70 and pore size of microscreen 9 attuned to allow a commercially useful flow rate of impure water 70 through microscreen 9, some impurities or contaminants will not be able to pass through the microscreen and will settle on its inner surface, but certain colloidal or organic impurities present in the impure water can pass through the pores of microscreen 9. This passage of impurities can be prevented by dispersing insoluble, finely divided particulate matter 74 into impure water 70 before it passes through microscreen 9.

Particulate matter 74 must have a size and density that enable it to be rapidly and uniformly dispersed throughout impure water 70. It has been found that particulate matter 74 should have a diameter between substantially 1 to 100 microns. Thus, at least a portion of the finely divided particulate matter 74 can pass through the preferred 1 to 30 micron pore sizes of microscreen 9.

Means 24 is adjusted to control the speed at which means 18 rotates microscreen 9 about its longitudinal axis 12, so that impure water 70 passing through microscreen 9 deposits and forms an intermixed layer 76 of contaminants and particulate matter over substantially the entire inner surface of microscreen 9 during each rotation or revolution thereof. Intermixed layer 76 forms a filter substantially impermeable to any of the contaminants and particulate matter of a size able to pass through the pores of microscreen 9, but it is permeable to water and does not substantially alter the flow rate of impure water 70 through microscreen 9. It has been found that rotating microscreen 9 at a rate such that its periphery travels between 10 to 125 feet per minute will cause formation of the desired intermixed layer 76. A rate less than 10 will not provide adequate mixing of impure water 70 and particulate matter 74 inside microscreen 9, while a rate greater than 125 will not form the desired intermixed layer 76.

Finely divided particulate matter 74 can include such matter as activated alumina, activated carbon, clinoptilolite, diatomaceus earth, fly ash, fuller's earth, rice hulls and wood fibers and suitable ion exchange resins. If the matter 74 employed is also a sorbent material, the impurities or contaminants present in impure water 70 can be removed therefrom within microscreen 9 by both the sorbent and filtering characteristics of particulate matter 74. Preferably, particulate matter 74 can be fresh powdered activated carbon having more than half of its particles less than 30 microns in diameter. Such carbon is highly adsorbent of colloidal and soluble impurities, rapidly dispersed throughout impure water 70 and relatively inexpensive to obtain, when compared to other suitable particulate matter. Further, powdered activated carbon will remove any trace amounts of chlorine by chemical action between the carbon and chlorine.

As shown in FIGS. 2 and 3, finely divided particular matter 74 can be dispersed into impure water 70 upstream of microscreen 9, e.g. in the influent reservoir or feed channels leading thereto, by suitable means therefor. However, it will be apparent that particulate matter 74 can be dispersed into impure water 70 within the cylindrical space of microscreen 9. Surprisingly, it has been found, that when powdered activated carbon, the preferred particulate 74, is employed in this process, substantially all the resultant adsorption of the impurities or contaminants present in impure water 70 will occur within 1 to 5 minutes after the powdered activated carbon has been dispersed into impure water 70.

Thus, particulate matter 74 dispersed into impure water 70 five minutes before it passes through microscreen 9 will have adsorbed all the contaminants in impure water 70 that can be adsorbed by particulate matter 74. Preferably, the amount of particulate matter 74 dispersed into impure water 70 can be predetermined, by monitoring means or experience, to sorb substantially all of the contaminants in impure water 70 before it passes through microscreen 9.

Backwash header 20 is controlled by means 24, as explained above. Header 20 is adjusted to remove the intermixed layer 76 of contaminants and finely divided particulate matter 74 from the inner surface of the screening material of microscreen 9 on each rotation thereof by passing backwash water through microscreen 9 from the outer surface thereof at a height above the stream of impure water 70 moving through microscreen 9. In this manner, the thickness and permeability of intermixed layer 76 can be carefully controlled and maintained.

Additionally, as microscreen 9 rotates, some of intermixed layer 76 will be sheared from the inner surface of microscreen 9 by impure water 70 in the cylindrical space of microscreen 9 and redispersed in the water. Advantageously, this shearing allows particulate matter 74 to sorb more contaminants from impure water 70 before again being deposited on the inner surface of microscreen 9.

In the preferred microscreen 9, as shown in FIG. 2, hopper 22 is mounted within the cylindrical space of microscreen 9 above the stream of impure water 70 and located to receive the drained residue 78 of backwash water, contaminants and particulate matter backwashed from microscreen 9, without permitting the re-entry of drained residue 78 into impure water 70. Hopper 22 has a drainpipe 23 having its inlet in fluid communication with hopper 22 and extending out of the cylindrical space of microscreen 9 through the open end of frame 10 for draining drained residue 78 from hopper 22. It will be apparent that other means of collecting and draining drained residue 78 from microscreen 9 can be employed, if so desired.

Drained residue 78 can be regenerated by such known processes as wet oxidation or fluidized bed, starved air incineration to produce regenerated or fresh finely divided particulate matter 74 for use in the process of FIG. 3. However, if the drained residue 78 can be further used as drained from microscreen 9, the effective cost of particulate matter 74 in the process of FIG. 3 can be significantly reduced.

Figure 4:
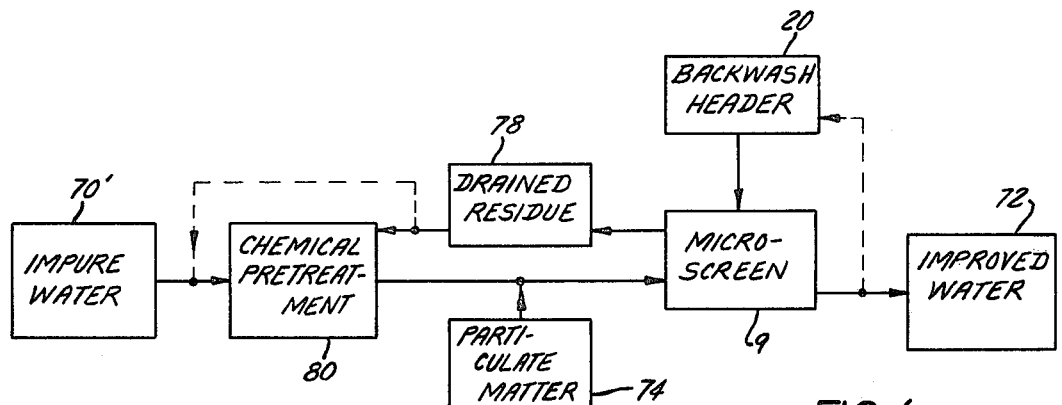
FIG. 4 is a schematic representation of the steps comprising a second embodiment of this invention.

Ideally, drained residue 78 can be employed in the pretreatment of impure water 70 containing more substantial amounts of contaminants than contemplated by FIG. 3, prior to its passage through microscreen 9. FIG. 4 schematically illustrates an embodiment of this invention wherein impure water 70' is subjected to a chemical pretreatment 80, before it reaches microscreen 9. Chemical pretreatment 80 can be any such treatment including the addition of chemicals commonly used for reduction, oxidation, pH control, flocculation, coagulation and precipitation of contaminants or impurities. Such chemicals can include alum, biochemicals, ferric chloride, hydrochloric acid, lime, sodium hydroxide, sulfuric acid and polyelectrolytes. Chemical pretreatment 80 can also include a clarification step, such as air flotation, centrifugation and gravity sedimentation.

In the process of FIG. 4, drained residue 78 from microscreen 9 can be added to impure water 70' at an advantageous point during chemical pretreatment 80, or alternatively, before impure water 70' is subjected to chemical pretreatment 80. In this process, drained residue 78 assists the pretreatment of impure water 70' by sorbing, coagulating, flocculating or precipitation of impurities or contaminants therein. Ultimately, drained residue 78 is removed from chemical pretreatment 80 along with the chemical sludges resulting therefrom.

Figure 5:
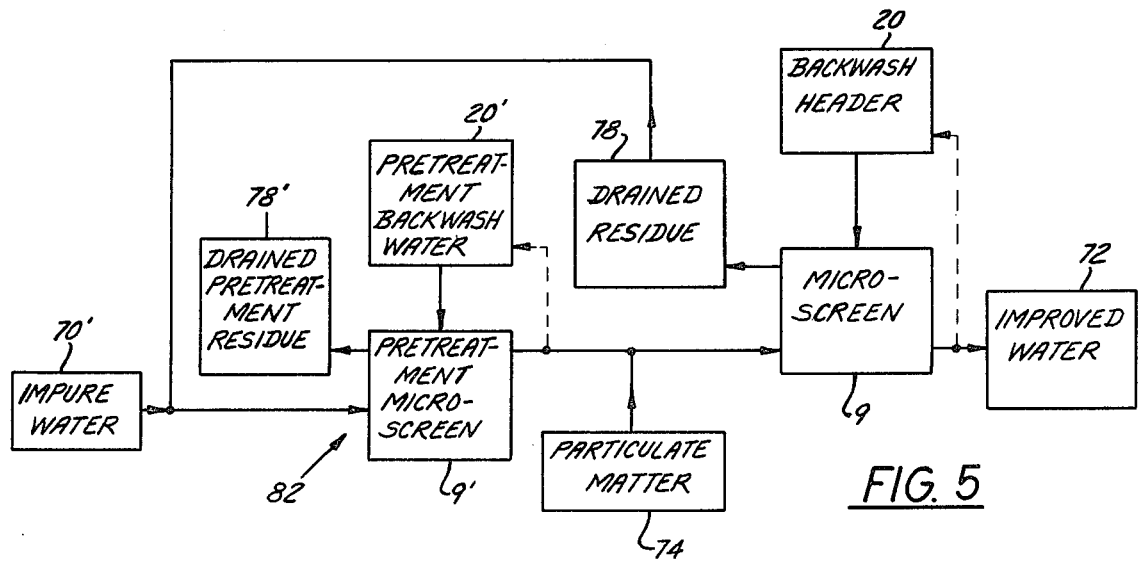
FIG. 5 is a schematic representation of the steps comprising a third embodiment of this invention.

FIG. 5 schematically illustrates an embodiment of this invention wherein impure water 70' is subjected to a physical pretreatment 82 before it arrives at microscreen 9. While physical pretreatment 82 can include numerous forms of physically removing impurities or contaminants from impure water 70', as shown in FIG. 5, the preferred physical pretreatment 82 employs a pretreatment-microscreen 9' operated substantially identically to the above-described microscreen 9. However, whereas microscreen 9 employs fresh particulate matter 74, pretreatment microscreen 9' employs drained residue 78 from microscreen 9 as its source of finely divided particulate matter. Drained pretreatment residue 78' can be regenerated or reused in the same manner as drained residue 78.

It will be apparent that more than two microscreens can be employed in series, in the process of FIG. 5 if so desired. Likewise, it will be apparent that various combinations of the processes of FIGS. 4 and 5 can be employed, so that the pretreatment of impure water 70' can be both chemical and physical.

Microscreens useful in the practice of this invention are commercially available in lengths of 2–16 feet and diameters of 6–12 feet from Envirex Inc., Waukesha, WI., U.S.A. When the positive pressure head of impure water 70 and the pore size of the screening material of microscreen 9 are identical, the residence time of impure water 70 in the cylindrical space of microscreen 9 varies in direct proportion to the diameter, but not the length of the microscreen.

EXAMPLE 1

When a common source of impure water 70 was passed through microscreens of varying diameter and length in a process having the pressure head and pore size attuned to respectively move 6 and 10 gallons per minute per square foot therethrough, the following results were observed:

| Diameter (ft.) | Length (ft.) | Flow Rate (gpm./ft.²) | Residence (min.) |
| --- | --- | --- | --- |
| 6 | 4 | 6 | 2.6 |
| 6 | 12 | 6 | 2.6 |
| 6 | 4 | 10 | 2.0 |
| 6 | 12 | 10 | 2.0 |
| 8 | 4 | 6 | 3.4 |
| 8 | 14 | 6 | 3.4 |
| 8 | 4 | 10 | 2.7 |
| 8 | 14 | 10 | 2.7 |
| 10 | 4 | 6 | 4.2 |
| 10 | 16 | 6 | 4.2 |
| 10 | 4 | 10 | 3.4 |
| 10 | 16 | 10 | 3.4 |

When finely divided particulate matter 74 is a sorbent material, the characteristics and concentrations of particulate matter 74 and contaminants in impure water 70 and the flow pattern of impure water 70 through microscreen 9 determine the amount of contaminants that will be sorbed from impure water 70 by particulate matter 74 while in microscreen 9. A study of powdered carbons for wastewater treatment and methods for their application was published in Publication No. PB 191538 (1969) by the U.S. Department of the Interior. It discloses that a given amount of powdered activated carbon dispersed in a given amount of impure water containing organic contaminants adsorbs substantially all the organic contaminant that it will adsorb within 1 minute after its dispersion therein. After 5 minutes, no substantial adsorbtion of the organic contaminants occurs.

EXAMPLE 2

The final effluent from a sewage treatment plant was tested and found to contain soluble organic impurities. Then to each of 4 beakers containing 1 liter of the effluent, 500 mg. of a powdered activated carbon was dispersed and mixed for 1, 2, 4 and 10 minutes, respectively, before the effluent was passed through a microscreen filtering material having at least half of its pores 6 microns in diameter and the remainder between 1 to 30 microns. The effluent was then collected and retested. A control sample was likewise filtered and retested and the following results obtained.

| Residence Time (Min.) | Initial Soluble Organics (mg./l.) | Final Soluble Organics (mg./l.) |
| --- | --- | --- |
| 0 | 11 | 11 |
| 1 | 11 | 4 |
| 2 | 11 | 4 |
| 4 | 11 | 4 |
| 10 | 11 | 3 |

EXAMPLE 3

When the procedure of Example 2 was repeated with another effluent sample, the following results were obtained.

| Residence Time (Min.) | Initial Soluble Organics (mg./l.) | Final Soluble Organics (mg./l.) |
| --- | --- | --- |
| 0 | 6 | 6 |
| 1 | 6 | 2 |
| 2 | 6 | 2 |
| 4 | 6 | 2 |
| 10 | 6 | 1 |

EXAMPLE 4

A microscreen 9 of the preferred type in FIG. 1 was provided in which frame 10 has a 4 foot diameter and a 2 foot length. The polyester screening material of microscreen grids 16 had pores with diameters substantially all 6 microns in diameter. Impure water 70 originating from a municipal sewage treatment lagoon was introduced into the cylindrical hollow space of microscreen 9. Microscreen 9 was 54% submerged and rotated at a rate of 4 revolutions per minute so that its periphery traveled 50 feet per minute. Backwash water was sprayed onto microscreen 9 at a rate of 6.75 gallons per minute per axial foot (gpm/aft). Backwash water penetrating the grids 16 and collected in backwash receiving trough 22 was 1.0 gpm/aft. Impure water 70 had a head of 14 inches. Two tests were performed to demonstrate the improvement effected by dispersing a finely divided particulate matter, activated carbon, into the impure water.

Test A was a control test to demonstrate the treatment possible without the application of finely divided particulate matter, while test B demonstrates the improvement when finely divided particulate matter was dispersed in the impure water. The test results were as follows:

|  | Test A | Test B |
| --- | --- | --- |
| Activated Carbon dosage, mg/l | none | 115 |
| Flow Rate, gpm/ft² submerged grids | 6.5 | 6.0 |
| Total organic content (BOD$_5$) |  |  |
| Impure water, mg/l | 31 | 38 |
| Improved water, mg/l | 15 | 8 |
| Removal, % | 52 | 79 |
| Soluble organic content (BOD$_5$) |  |  |
| Impure water, mg/l | 9 | 8 |
| Improved water, mg/l | 9 | 2 |
| Removal, % | 0 | 75 |
| Suspended Solids Content |  |  |
| Impure water, mg/l | 19 | 35 |
| Improved water, mg/l | 6 | 5 |
| Removal, % | 68 | 86 |

All measures of treatment effectiveness were improved by dispersing finely divided particulate matter into the impure water. Because of the adsorbent characteristics of powdered activated carbon, contaminants were both sorbed and filtered from the impure water in this process.

The improvement in suspended solids removal illustrates the described mechanism of physical entrapment aided by finely divided particulate. While the adsorption characteristics of the activated carbon had little to do with the suspended solids removal, the enhanced removal of soluble organics could be solely attributed to adsorption.

Without activated carbon addition, the grids 16 required daily cleaning to maintain the stated flow. However, with activated carbon no special cleaning was required. The activated carbon served to entrap colloidal solids which had been fouling the media. This additional benefit will be reflected in lower maintenance costs.

Having described the invention in specific detail and exemplified the manner in which it may be carried into practice, it will now be readily apparent to those skilled in the art that innumerable variations, applications, modifications and extensions of the basic principles involved may be made without departing from its sphere or scope.

We claim:

1. A process for removing colloidal and soluble contaminants from impure water, comprising:

providing a hollow cylindrical microscreen capable of maintaining its integrity when exposed to a positive water head pressure, said microscreen having pores substantially all from one to 30 microns in diameter, said microscreen mounted rotatably about its longitudinal axis on a hollow cylindrical frame complementary to said microscreen, said frame open at one end and closed at its opposite end; whereby a stream of said impure water entering the cylindrical space within said microscreen through said open end of said frame can only exit said cylindrical space by passing through said microscreen, while at least some of said contaminants will not be able to pass through said microscreen and will settle on the inner surface thereof, moving said impure water through said microscreen to provide improved water by introducing a stream of said impure water into said cylindrical space within said microscreen through said open end of said frame at a positive water head pressure, dispersing discrete, insoluble finely divided particulate matter having a diameter between 1 to 100 microns into said impure water, before said impure water passes through said microscreen leaving said contaminants and particulate matter on said inner surface of said microscreen, removing said contaminants and particulate matter from said inner surface of said microscreen by passing backwash water through said microscreen from the outer surface thereof at a height above said stream of impure water moving through said microscreen, collecting and draining said backwash water, removed contaminants and particulate matter extending out of said cylindrical space through said open end of said frame, and rotating said microscreen about its longitudinal axis at a rate predetermined to form during each rotation of said microscreen, as the result of said impure water passing through said microscreen, an intermixed layer of said contaminants and particulate matter over substantially the entire inner surface of said microscreen through which said stream of impure water is passing, thereby forming a filter substantially impermeable to any of said contaminants and particulate matter of a size able to pass through said pores of said microscreen, while maintaining said microscreen permeable to water, whereby said water pressure head and microscreen pore size will allow said impure water to pass through said microscreen at commercially useful flow rates, while said contaminants and particulate matter having sizes less than a pore of said microscreen are prevented from passing through said microscreen by said filtering layer of said contaminants and particulate matter.

2. The process for removing contaminants from impure water as defined in claim 1, wherein said finely divided particulate matter is a sorbent material capable of sorbing at least some of said contaminants in said impure water, so that removing said contaminants from said impure water comprises both sorbing and filtering said contaminants from said impure water.

3. The process for removing contaminants from impure water as defined in claim 1 or 2, wherein finely divided particulate matter is further characterized in that more than half of said particulate matter has a diameter of less than 30 microns.

4. The process for removing contaminants from impure water as defined in claim 1 or 2, wherein said microscreen pores are further characterized in that substantially all of said pores are six microns.

5. The process for removing contaminants from impure water as defined in claim 2, wherein said step of dispersing finely divided particulate matter into said impure water is performed before said impure water is introduced into said microscreen.

6. The process for removing contaminants from impure water as defined in claim 5, wherein said step of dispersing finely divided particulate matter into said impure water occurs less than five minutes before said impure water passes through said microscreen.

7. The process for removing contaminants from impure water as defined in claim 1 or 2, wherein said step of providing a microscreen is further characterized by the placing of said microscreen and frame into a tank having a first compartment providing a reservoir for said impure water prior to its introduction into said microscreen and a second compartment providing a reservoir for said improved water, said second compartment having a weir that controls the depth of said improved water in said second compartment so that a substantial portion of said microscreen is continuously submerged in said improved water in said second compartment.

8. The process for removing contaminants from impure water as defined in claim 1 or 2, wherein said contaminants and finely divided particulate matter are removed from the inner surface of said microscreen by passing backwash water through said microscreen at the top of said microscreen as it rotates about its longitudinal axis.

9. The process for removing contaminants from impure water as defined in claim 1 or 2, wherein said step of rotating said microscreen is further characterized by rotating said microscreen so that the periphery of said microscreen travels between ten to 125 feet per minute.

10. The process for removing contaminants from impure water as defined in claim 1 or 2 and further comprising the step of pretreating said impure water to remove contaminants therefrom before said impure water is introduced into said microscreen.

11. The process for removing contaminants from impure water as defined in claim 10, wherein said pretreatment is by a chemical process.

12. The process for removing contaminants from impure water as defined in claim 11 and further comprising mixing with said impure water said backwash water, removed contaminants and particulate matter drained from said microscreen as a part of said chemical process pretreatment of said impure water.

13. The process for removing contaminants from impure water as defined in claim 10, wherein said pretreatment is by a physical process.

14. The process for removing contaminants from impure water as defined in claim 13 wherein said pretreatment by a physical process comprises passing said impure water through a pretreatment-microscreen.

15. The process for removing contaminants from impure water as defined in claim 14, wherein said pretreatment further comprises dispersing discrete, insoluble finely divided particulate matter having a diameter between 1 to 100 microns into said impure water, before said impure water passes through said pretreatment-microscreen leaving said contaminants and particular matter on said inner surface of said pretreatment-microscreen.

16. The process for removing contaminants from impure water as defined in claim 15, wherein said step of dispersing finely divided particulate matter into said impure water before said impure water passes through said pretreatment-microscreen comprises mixing therewith said backwash water, removed contaminants and particulate matter drained from said microscreen.

17. The process for removing contaminants from impure water as defined in claim 16 wherein said step of pretreating said impure water further comprises mixing with said impure water, backwash water, removed contaminants and particulate matter drained from said pretreatment-microscreen and treating said mixture by a chemical process before said physical process.

18. The process for removing contaminants from impure water as defined in claim 1 or 2, wherein said step of moving said impure water through said microscreen is further characterized in that said stream of impure water is introduced into said microscreen at a positive water head pressure between six to 24 inches.

19. The process for removing contaminants from impure water as defined in claim 1 or 2, wherein said contaminants are organic materials.

20. The process for removing contaminants from impure water as defined in claim 2, wherein said contaminants include chlorine.

21. The process for removing contaminants from impure water as defined in claim 1 or 2, wherein said microscreen is made of a material chosen from the group consisting of nylon, polyester, polytetrafluroethylene and stainless steel fabric.

22. The process for removing contaminants from impure water as defined in claim 21 wherein said material is integrally molded to a honeycomb-like grid made of 20% glass-filled polypropylene.

23. The process for removing contaminants from impure water as defined in claim 2, wherein said step of dispersing finely divided particulate matter into said impure water comprises dispersing an amount of said matter predetermined to sorb substantially all of said contaminants in said impure water before it passes through said microscreen.

24. The process for removing contaminants from impure water as defined in claim 1, wherein said finely divided particulate matter is chosen from the group consisting of activated alumina, activated carbon, clinoptilolite, diatomaceous earth, fly ash, fuller's earth, rice hulls and wood fibers.

25. The process for removing contaminants from impure water as defined in claim 1 or 2, wherein said finely divided particulate matter is powdered activated carbon.

26. The process for removing contaminants from impure water as defined in claim 1 or 2, wherein said step of collecting and draining comprises collecting said backwash water, removed contaminants and particulate matter in a hopper mounted within said cylindrical space of said microscreen above said stream of impure water at a location preventing the entrance of said backwash water, removed contaminants and particulate matter to said impure water within said cylindrical space, and draining said backwash water, removed contaminants and particulate matter from said hopper through a drainpipe having its inlet in fluid communication with said hopper and extending out of said cylindrical space through said open end of said frame.

* * * * *